(12) United States Patent
Lee et al.

(10) Patent No.: US 8,487,926 B2
(45) Date of Patent: Jul. 16, 2013

(54) METHOD AND APPARATUS FOR GENERATING 3D IMAGE USING 2D PHOTOGRAPH IMAGES

(75) Inventors: Hee-sae Lee, Yongin-si (KR);
Young-Ihn Kho, Seoul (KR);
Jeong-hwan Ahn, Suwon-si (KR);
Do-kyoon Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1114 days.

(21) Appl. No.: 12/078,181

(22) Filed: Mar. 27, 2008

(65) Prior Publication Data
US 2009/0079730 A1 Mar. 26, 2009

(30) Foreign Application Priority Data
Sep. 21, 2007 (KR) .................. 10-2007-0096961

(51) Int. Cl.
*G06T 15/00* (2011.01)
(52) U.S. Cl.
USPC .......................................... 345/419; 345/654
(58) Field of Classification Search
USPC ................................................ 345/419, 654
See application file for complete search history.

(56) References Cited

U.S. PATENT DOCUMENTS

| 2003/0026469 A1* | 2/2003 | Kreang-Arekul et al. ..... 382/132 |
| 2004/0196282 A1* | 10/2004 | Oh ................................ 345/419 |
| 2004/0252884 A1* | 12/2004 | Foote et al. .................. 382/162 |
| 2008/0033642 A1* | 2/2008 | Emoto et al. ................. 701/209 |

FOREIGN PATENT DOCUMENTS
KR   10-2003-0054360   7/2003

OTHER PUBLICATIONS

Linhong et al. "A Stitching Algorithm of Still Pictures with Camera Translation" Cyber Worlds, 2002 IEEE.*
Bradley et al. "Image-based Navigation in Real Environments Using Panoramas" IEEE 2005 pp. 57-59.*
Byong Mok Oh "Image-Based Modeling and Photo Editing", ACM SIGGRAPH, Aug. 2001, p. 441.*
Zheng et al. "Scanning Scene Tunnel for City Traversing", IEEE Transactions on Visualization and Computer Graphics, vol. 12, No. 2, Mar./Apr. 2006, p. 163.*
Mashburn, Brian Christopher, "Toward Autonomous 3D Scene Construction in Real-Time", brynmawr.edu, University of Arkansas at Little Rock, May 1998, pp. 6-10, 30-32.*

* cited by examiner

*Primary Examiner* — Maurice L McDowell, Jr.
(74) *Attorney, Agent, or Firm* — Staas & Halsey LLP (57) ABSTRACT

Provided is a method and apparatus for generating a 3D image including: generating a 2D panorama image showing the whole scene by combining a plurality of 2D images, each of which partially showing the scene; and generating a 3D image by folding the 2D panorama image on the basis of image information on the 2D panorama image.

14 Claims, 12 Drawing Sheets
(7 of 12 Drawing Sheet(s) Filed in Color)

METHOD AND APPARATUS FOR GENERATING 3D IMAGE USING 2D PHOTOGRAPH IMAGES

CROSS-REFERENCE TO RELATED PATENT APPLICATION

This application claims the benefit of Korean Patent Application No. 10-2007-0096961, filed on Sep. 21, 2007, in the Korean Intellectual Property Office, the disclosure of which is incorporated herein in its entirety by reference.

BACKGROUND OF THE INVENTION

1. Field of the Invention

The present invention relates to a 3D modeling technology, and more particularly, to a method and apparatus for generating a 3D image by using a plurality of 2D photograph images.

2. Description of the Related Art 3D modeling technologies have been actively developed in computer graphics fields or computer vision fields. In the computer graphics fields, sophisticated computer aided design (CAD) systems for modeling geometric information and material information on an object in a 3D space have been developed. However, since the geometric information on the object in a real world is very complex and accurately modeling lighting effects is difficult, the aforementioned techniques cannot be easily applied to produce a realistic image. In the computer vision fields, techniques for obtaining 3D geometric information from 2D images and obtaining material information on an object under a lighting condition in a real world by using real images have been developed. However, in the aforementioned techniques, there is a problem in that calculation for obtaining the 3D geometric information is very complex.

SUMMARY OF THE INVENTION

The present invention provides a method and apparatus for generating a 3D image very simply without complex calculation for obtaining 3D geometric information. The present invention also provides a computer-readable medium having embodied thereon a computer program for the method.

Objects of the present invention are not limited to the aforementioned objects, and another object may exist. This will be understood by those of ordinary skill in the art by the following description.

According to an aspect of the present invention, there is provided a method of generating a 3D image including: generating a 2D panorama image showing the whole scene by combining a plurality of 2D images, each of which partially showing the scene; and generating a 3D image by folding the 2D panorama image on the basis of image information on the 2D panorama image.

According to another aspect of the present invention, there is provided a computer-readable medium having embodied thereon a computer program for the method of generating a 3D image.

According to another aspect of the present invention, there is provided an apparatus for generating a 3D image including: a 2D panorama image generator generating a 2D panorama image showing the whole scene by combining a plurality of 2D images, each of which partially showing the scene; and a 3D image generator generating a 3D image by folding the 2D panorama image on the basis of image information on the 2D panorama image.

According to another aspect of the present invention, there is provided a navigation method used in a navigation system, including: generating a 3D image by folding a 2D panorama image on the basis of image information on the 2D panorama image; and extracting a 3D image corresponding to current position information on the navigation system from 3D images including the generated 3D image and performing rendering on the extracted 3D image on a 2D plane corresponding to a moving direction of a moving object provided with the navigation system.

According to another aspect of the present invention, there is provided a navigation system including: an apparatus for generating a 3D image generating a 3D image by folding a 2D panorama image on the basis of image information on the 2D panorama image; a memory storing the generated 3D image; and a rendering apparatus extracting a 3D image corresponding to current position information on the navigation system from 3D images stored in the memory and performing rendering on the extracted 3D image on a 2D plane corresponding to a moving direction of a moving object provided with the navigation system.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the attached drawings.

Figure 1:
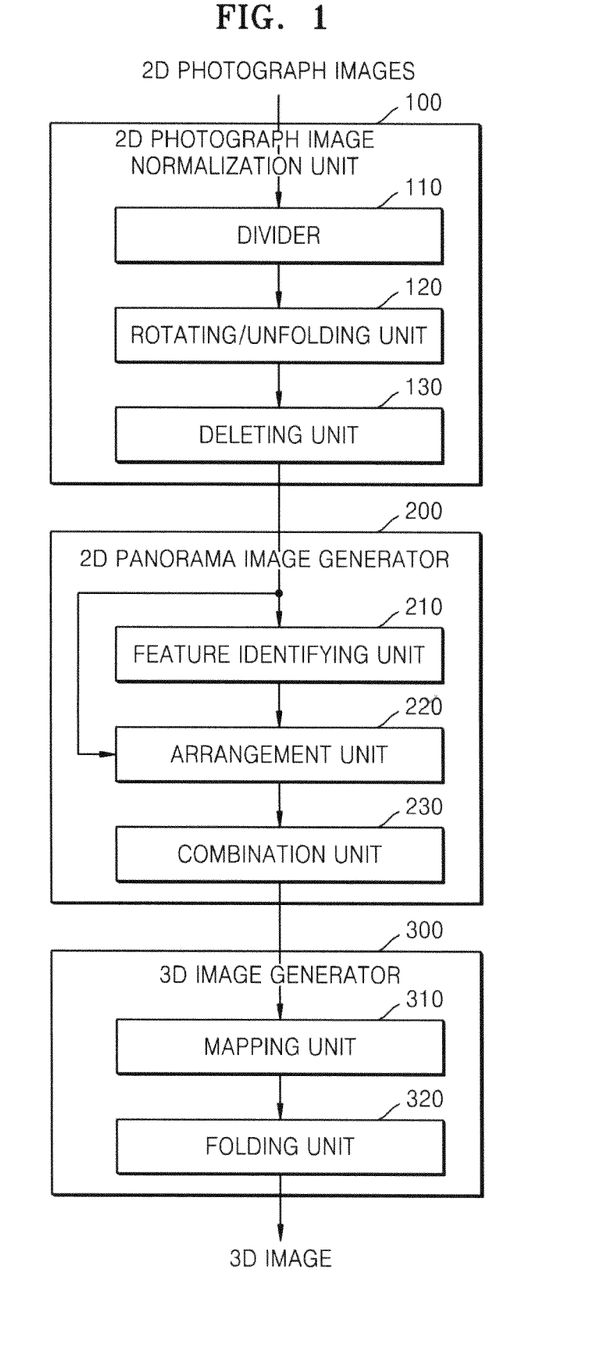
FIG. 1 is a structural view illustrating an apparatus for generating a 3D image according to an embodiment of the present invention.

FIG. 1 is a structural view illustrating an apparatus for generating a 3D image according to an embodiment of the present invention.

Figure 2:
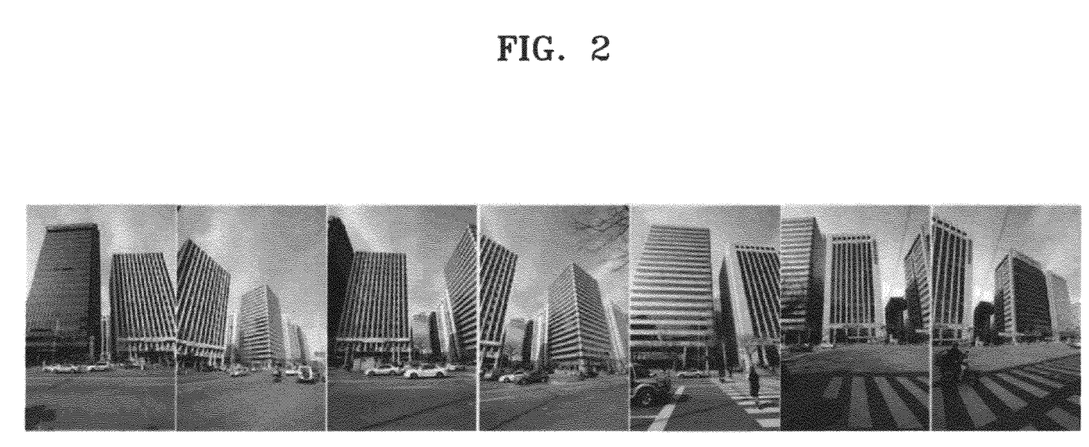
FIG. 2 is a view illustrating a plurality of 2D photograph images, each of which partially showing a scene in a real world.

Referring to FIG. 1, the apparatus for generating a 3D image according to the embodiment includes a 2D photograph image normalization unit 100, a 2D panorama image generator 200, and a 3D image generator 300. FIG. 2 is a view illustrating a plurality of 2D photograph images, each of which partially showing a scene in a real world. A user shoots a scene for 3D image-ring by using a camera at various positions and elevations. As described above, the 2D photograph images taken at various positions and elevations may be images, each of which partially showing the scene. Particularly, the user takes 2D photograph images so that each of the 2D photograph images shows one or more surfaces of an object.

The apparatus for generating a 3D image illustrated in FIG. 1 is an apparatus for simply generating a 3D image by using the 2D photograph images as illustrated in FIG. 2. When the apparatus for generating a 3D image illustrated in FIG. 1 is applied to a navigation system, 2D photograph images may be obtained from a camera provided to a moving object.

The 2D photograph image normalization unit 100 normalizes a plurality of 2D photograph images, each of which partially showing a scene to modify image deterioration according to a perspective view of a camera lens facing a particular direction. Matching the 2D photograph images normalized by the 2D photograph image normalization unit 100 with each other can be easily performed.

Referring to FIG. 1, the 2D photograph image normalization unit 100 includes a divider 110, a rotating/unfolding unit 120, and a deleting unit 130.

The divider 110 receives 2D photograph images as illustrated in FIG. 1 and divides the 2D photograph images according to lines corresponding vertical edges of each object in the 2D photograph images. Specifically, the 2D photograph images are divided in units of surfaces of each object by the divider 110, and each of divided parts of the 2D photograph images may show a surface of an object. The division of the object may be manually performed by the user or automatically performed by using an edge detection algorithm.

For the manual division, the user draws a line corresponding to each of vertical edges of objects in the 2D photograph images output on a computer monitor by using an input tool such as a touch pen and a mouse, and the divider 110 divides the 2D photograph images according to information input by the user, that is, information on the lines corresponding to the vertical edges of the objects. Next, for the automatic division, the divider 110 detects vertical edges corresponding to points where changes in luminous intensity increase above a threshold value in a horizontal direction in the 2D photograph images and divides the 2D photograph images according to lines corresponding to the detected vertical edges. Here, it will be understood by those of ordinary skill in the art that various division methods in addition to the aforementioned division methods can be applied.

The rotating/unfolding unit 120 rotates the lines of the parts of the 2D photograph images divided by the divider 110 to be in parallel with each other in a vertical direction and unfolds the divided parts including the rotated lines. More specifically, the rotating/unfolding unit 120 modifies coordinate values (x, y) of pixels of the 2D photograph images so that the lines of the parts of the 2D photograph images divided by the divider 110 are in parallel with each other and modifies the coordinate values (x, y) of the pixels of the 2D photograph images so that the parts of the 2D photograph images are unfolded.

In this case, since intervals between the lines are changed due to the rotation of the lines as described above, some pieces of image information such as color values of pixels having the modified coordinate values may be overlapped or omitted. Specifically, when the intervals between the lines of the divided parts of the 2D photograph images are modified to be narrower than the original intervals and coordinate values of some pixels are overlapped, the rotating/unfolding unit 120 unifies image information on the some pixels. For example, the rotating/unfolding unit 120 calculates an average value of the image information on the some pixels and sets the average value to the image information on the pixels having the overlapped coordinate values. In addition, when the intervals between the lines of the divided parts of the 2D photograph images are modified to be wider than the original intervals and coordinate values of some pixels are omitted, the rotating/unfolding unit 120 interpolates image information on the some pixels. For example, the rotating/unfolding unit 120 calculates an average value of image information of adjacent pixels of the some pixels and sets the average value to the image information on the pixels having the omitted coordinate values.

Figure 3A:
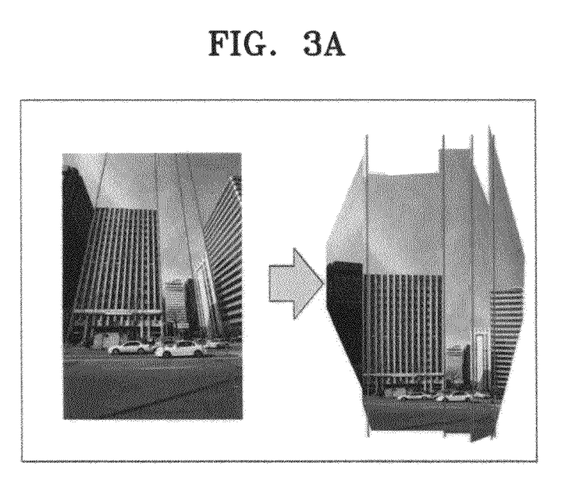
FIG. 3 is a view illustrating raw images and images processed by a rotating/unfolding unit illustrated in FIG. 1.
Figure 3B:
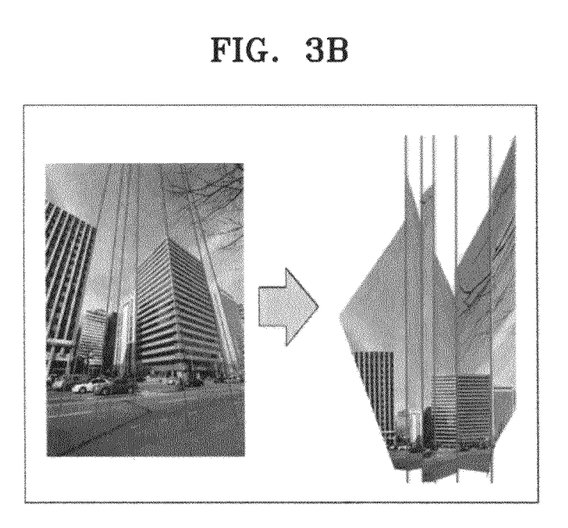

FIG. 3 is a view illustrating raw images and images processed by the rotating/unfolding unit 120. Referring to FIG. 3, it can be seen that each of the parts of the 2D photograph images divided by the divider 110 is an image showing a surface of an object (a building in FIG. 3) and lower and upper portions of the surface. As illustrated on the right in FIG. 3, when a 2D photograph image shows a front surface and a side surface of an object, the rotating/unfolding unit 120 unfolds the object so that the side surface of the object faces forward.

Figure 4:
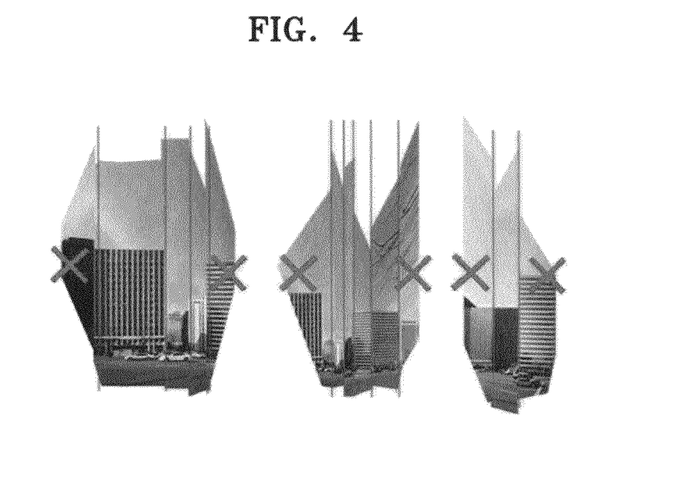
FIG. 4 is a view illustrating the 2D photograph images deleted by a deleting unit illustrated in FIG. 1.

The deleting unit 130 deletes a divided part having one or more defective surfaces from the divided parts of the 2D photograph images rotated and unfolded by the rotating/unfolding unit 120. Here, the defective surface is a surface in which one or more of pixel values are omitted. FIG. 4 is a view illustrating the 2D photograph images deleted by the deleting unit 130.

The 2D panorama image generator 200 generates a 2D panorama image showing the whole scene by combining the 2D photograph images normalized by the 2D photograph image normalization unit 100.

Referring to FIG. 1, the 2D panorama image generator 200 includes a feature identifying unit 210, an arrangement unit 220, and a combination unit 230.

The feature identifying unit 210 identifies features of the divided parts of the 2D photograph images normalized by the 2D photograph image normalization unit 100 from each other, and when a difference between features of two or more identified divided parts is less than a threshold range, determined that the two or more divided parts are the same. Thereafter, the feature identifying unit 210 grants the same label to the two or more divided parts. In addition, when a difference between features of two or more identified divided parts exceeds the threshold range, the feature identifying unit 210 determines that the divided parts are different from each other and grants different labels to the divided parts. Particularly, according to the embodiment, the feature identifying unit 210 identifies the features of the object surfaces corresponding to the divided parts of the 2D photograph images. In addition, according to the embodiment, the "threshold range" is referred to as a standard for determining identities of the object surfaces and may be properly set according to a resolution of the 2D photograph image, a photographing environment, and the like.

However, when an object surface corresponding to one of the divided parts of the 2D photograph images normalized by the 2D photograph image normalization unit 100 and an object surface corresponding to another divided part of the divided parts thereof are the same object surface, scales of the object surfaces corresponding to the one and the another of the divided parts may be different from each other. Therefore, the feature of the object surface identified by the feature identifying unit 210 has to be unaltered by a scale. As described above, a method of extracting a scale invariant feature of an object surface is disclosed in U.S. Pat. No. 6,711,293.

Figure 5:
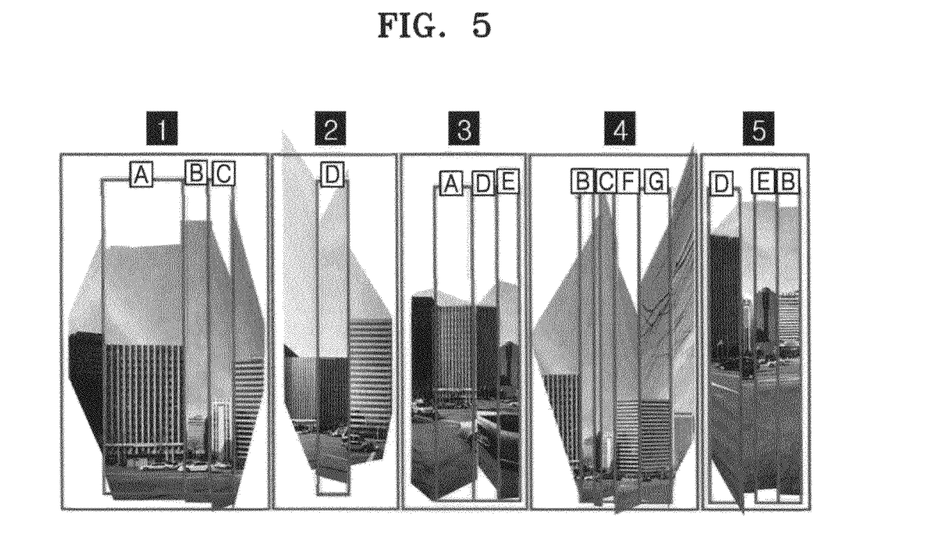
FIG. 5 is a view illustrating divided parts of the 2D photograph images to which labels are granted by a feature identifying unit illustrated in FIG. 1.

FIG. 5 is a view illustrating the divided parts of the 2D photograph images to which labels are granted by the feature identifying unit 210. Referring to FIG. 5, three divided parts of a first 2D photograph image are labeled with A, B, and C, respectively. In addition, a divided part of a second 2D photograph image is labeled with D. In addition, three divided parts of a third 2D photograph image are labeled with A, D, and E, respectively. In addition, four divided parts of a fourth 2D photograph image are labeled with B, C, F, and G, respectively. In addition, three divided parts of a fifth 2D photograph image are labeled with D, E, and B, respectively. Particularly, in FIG. 5, it can be seen that the same label is granted to divided parts corresponding to object surfaces having the same feature.

The arrangement unit 220 arranges the divided parts of the 2D photograph images so that the divided parts which are determined to be the same from among the divided parts of the 2D photograph images by the feature identifying unit 210 are positioned at the same position. More specifically, the arrangement unit 220 sequentially arranges arbitrary divided parts of the 2D photograph images and arranges the divided parts of the 2D photograph images so that a divided part of other divided parts of the 2D photograph images, which has the same label as the divided part arranged in advance is positioned at the same position as the divided part arranged in advance.

Figure 6:
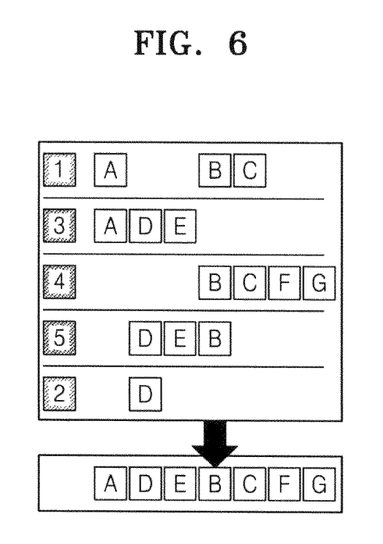
FIG. 6 is a view illustrating an operation of arranging the divided parts performed by an arrangement unit illustrated in FIG. 1.

FIG. 6 is a view illustrating an operation of arranging the divided parts performed by the arrangement unit 220. Referring to FIG. 6, the arrangement unit 220 sequentially arranges the divided parts labeled with A, B, and C of the first 2D photograph image. In this case, although the divided parts labeled with A, B, and C of the first 2D photograph image are adjacent, the divided parts labeled with A, B, and C do not need to be arranged to be adjacent, and final positions of the divided parts are determined after arranging all of the 2D photograph images. This will be applied later.

Next, the arrangement unit 220 arranges the divided part labeled with A of the third 2D photograph image having the divided part granted with the same label as the first 2D photograph image, to the same position as the divided part labeled with A arranged in advance, and sequentially arranges the divided parts labeled with A, D, and E. Next, the arrangement unit 220 arranges the divided part labeled with B of the fourth 2D photograph image having the divided part granted with the same label as the first 2D photograph image, to the same position as the divided part labeled with B arranged in advance, and sequentially arranges the divided parts labeled with B, C, F, and G.

Next, the arrangement unit 220 arranges the divided part labeled with B of the fifth 2D photograph image having the divided part granted with the same label as the first 2D photograph image, to the same position as the divided part labeled with B arranged in advance, and sequentially arranges the divided parts labeled with D, E, and B. Particularly, it can be seen that the divided parts labeled with D and E are included in the third 2D photograph image arranged in advance. In this case, the arrangement unit 220 arranges the divided parts labeled with D and E of the fifth 2D photograph image to have the same positions as those of the divided parts labeled with D and E of the third 2D photograph image. Next, the arrangement unit 220 arranges the divided part labeled with D of the second 2D photograph image having the divided part granted with the same label as the third 2D photograph image, to the same position as the divided part labeled with D arranged in advance. Through the aforementioned operations, finally, the divided parts labeled with A, D, E, B, C, F, and G are sequentially arranged.

The combination unit 230 combines the divided parts arranged by the arrangement unit 220 so that the divided parts arranged at the same position by the arrangement unit 220 are represented as a single divided part. More specifically, the combination unit 230 combines the divided parts arranged by the arrangement unit 220 by selecting a divided part having image information with larger data from the divided parts arranged at the same position by the arrangement unit 220. In addition, when two or more of the selected divided parts have different scales, the combination unit 230 modifies coordinate values and image information on pixels of the divided parts so that the divided parts have the same scale.

Figure 7:
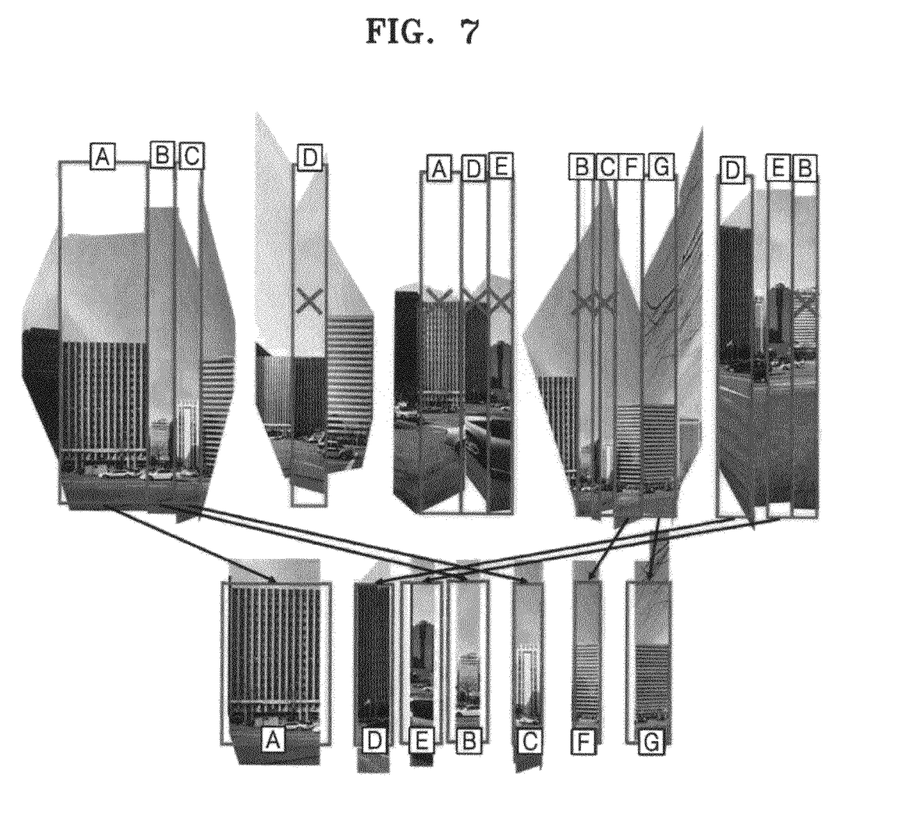
FIG. 7 is a view illustrating an operation of combining the 2D photograph images performed by a combination unit illustrated in FIG. 1.
Figure 8:
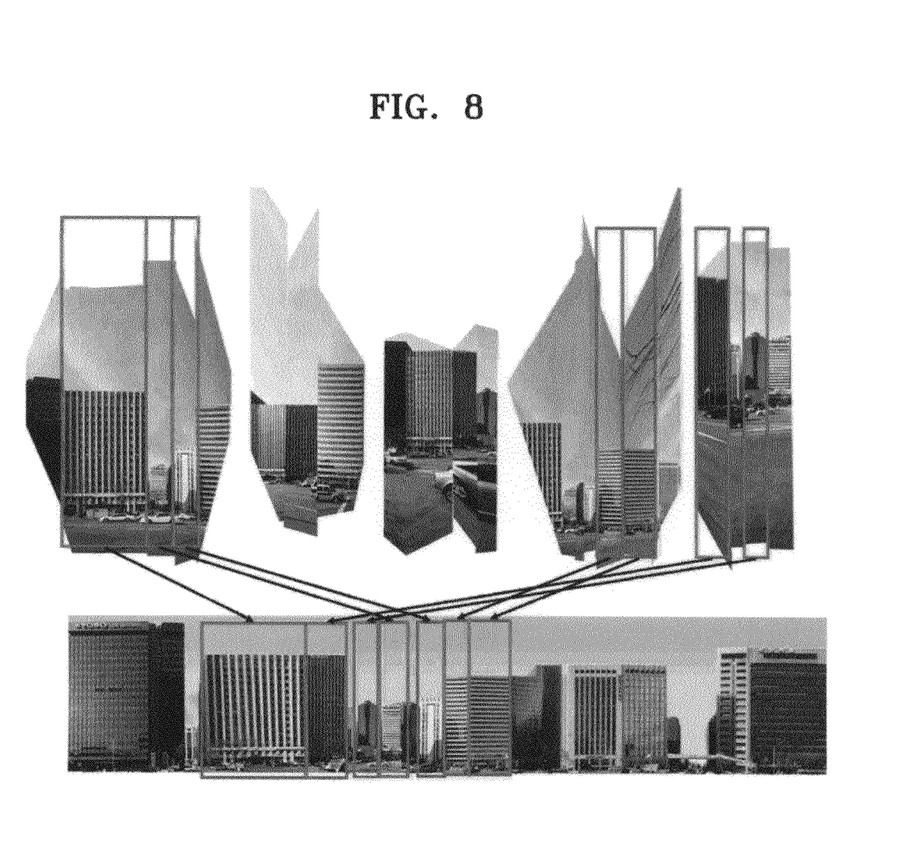
FIG. 8 is a view illustrating a 2D panorama image generated by a combination unit illustrated in FIG. 1.

FIG. 7 is a view illustrating an operation of combining the 2D photograph images performed by the combination unit 230. Referring to FIG. 7, the combination unit 230 selects the divided part labeled with A of the first 2D photograph image having image information with larger data from the divided parts arranged at the position of the label A from among the 2D photograph images arranged in order of the divided parts labeled with A, D, E, B, C, F, and G. Next, the combination unit 230 selects the divided part labeled with D of the fifth 2D photograph image having image information with larger data from the divided parts arranged at the position of the label D. Next, the combination unit 230 selects the divided part labeled with E of the fifth 2D photograph image having image information with larger data from among the divided parts arranged at the position of the label E. Next, the combination unit 230 selects the divided part labeled with B of the first 2D photograph image having image information with larger data from among the divided parts arranged at the position of the label B. Next, the combination unit 230 selects the divided part labeled with C of the first 2D photograph image having image information with larger data from among the divided parts arranged at the position of the label C. However, the divided parts arranged at the positions of the labels F and G exist only in the fourth 2D photograph image, so that the aforementioned selecting operation is not needed. FIG. 8 is a view illustrating a 2D panorama image generated by the combination unit 230.

The 3D image generator 300 generates a 3D image by folding the 2D panorama image generated by the 2D panorama image generator 200 on the basis of image information on the 2D panorama image generated by the 2D panorama image generator 200. More specifically, the 3D image generator 300 generates the 3D image by folding the 2D panorama image generated by the 2D panorama image generator 200 according to lines corresponding to vertical edges of each object in the 2D panorama image generated by the 2D panorama image generator 200.

Referring to FIG. 1, the 3D image generator 300 includes a mapping unit 310 and a folding unit 320.

Figure 9:
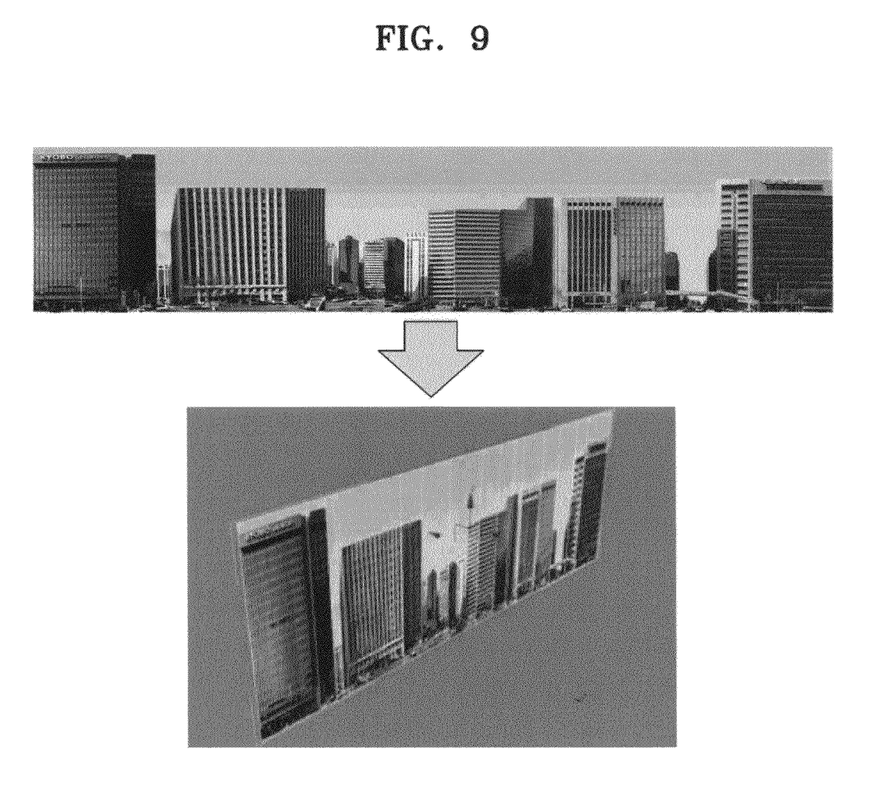
FIG. 9 is a view illustrating an image mapped to a 3D plane by a mapping unit illustrated in FIG. 1.

The mapping unit 310 performs mapping on the 2D panorama image generated by the 2D panorama image generator 200 to a 3D plane in which a coordinate value of each pixel is represented as a 3D coordinate (x, y, z). The coordinate values of all pixels of the 2D panorama image generated by the 2D panorama image generator 200 include only x and y values, so that z values of all pixels of the image mapped to the 3D plane by the mapping unit 310 may be 0 or a predetermined value set in advance. FIG. 9 is a view illustrating the image mapped to the 3D plane by the mapping unit 310.

Figure 10:
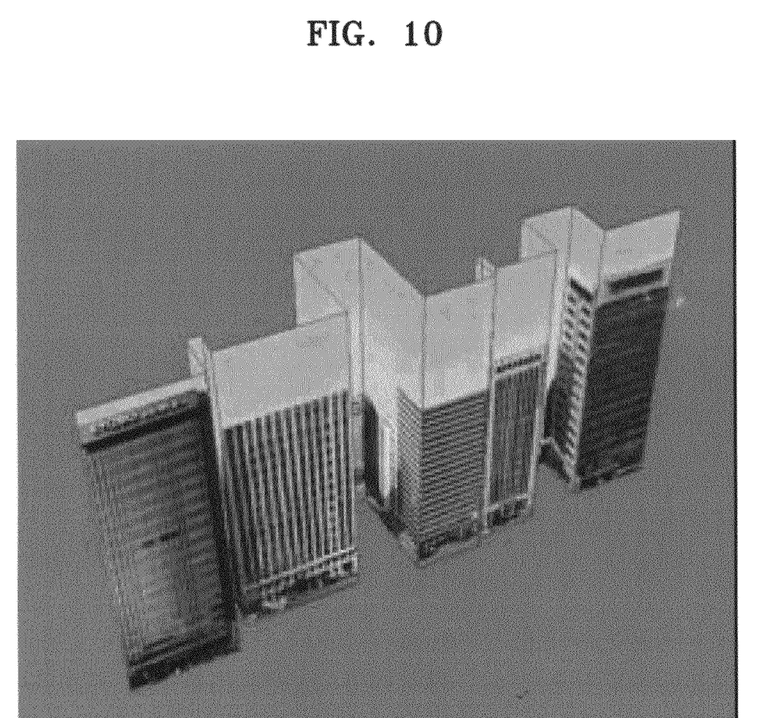
FIG. 10 is a view illustrating a 3D image generated by a folding unit illustrated in FIG. 1.

The folding unit 320 folds the image mapped to the 3D plane by the mapping unit 310 according to borders of the divided parts of the image mapped to the 3D plane by the mapping unit 310, that is, the lines corresponding to the vertical edges of each object. More specifically, the folding unit 320 folds the image mapped to the 3D plane by the mapping unit 310 by increasing depth values of pixels of lines corresponding to side surfaces of each object in proportion to distances between the lines corresponding to the vertical edges of each object and the lines corresponding to the side surfaces of each object in the image mapped to the 3D plane by the mapping unit 310. Accordingly, 3D coordinate values, that is, x, y, and z values of all pixels in the image mapped to the 3D plane by the mapping unit 310 can be generated. FIG. 10 is a view illustrating a 3D image generated by the folding unit 320. According to the current embodiment, the 3D image can be generated by simply folding the 2D image mapped to the 3D plane, so that the 3D image can be simply generated.

According to the current embodiment, "a side surface of an object" means a surface which is farther than another surface of the object from a viewpoint of a user, that is, a viewpoint of a camera taking the 2D photograph images. In other words, the nearest surface from the viewpoint of the camera taking the 2D photograph images is a front surface. However, in order for the folding unit 320 to fold the image mapped to the 3D plane by the mapping unit 310, whether or not an object surface of the divided parts of the image mapped to the 3D plane by the mapping unit 310 is a side surface has to be determined. The side surface determination may be manually performed by the user or automatically performed by using a side surface detection algorithm.

First, manual folding is described. When the user designates a divided part from among the divided parts output on a computer monitor as a side surface by using an input tool such as a touch pen and a mouse, the folding unit 320 folds the image mapped to the 3D plane by the mapping unit 310 by increasing depth values of pixels of lines corresponding to the side surface of each object in proportion to distances between the lines corresponding to the vertical edges of each object in the image mapped to the 3D plane by the mapping unit 310 and lines corresponding to the side surface designated by the information input by the user. Next, automation folding is described. The folding unit 320 determines whether or not two or more adjacent divided parts from among the divided parts of the image mapped to the 3D plane by the mapping unit 310 represent a single object, and according to a result of the determining, determines remaining divided parts excluding a divided part having the largest area from among the divided parts determined to represent the single object as side surfaces. Since the nearest surface of the object from the viewpoint of the camera taking the 2D photograph images is a front surface, a taken area of the front surface is larger than that of the side surface due to a perspective view of the camera lens. Therefore, the divided part having the largest area from among the divided parts representing the single object is the front surface, and the remaining divided parts are the side surfaces. Particularly, according to the embodiment, it will be understood by those skilled in the art that various folding methods in addition to the aforementioned folding methods may be applied.

Figure 11:
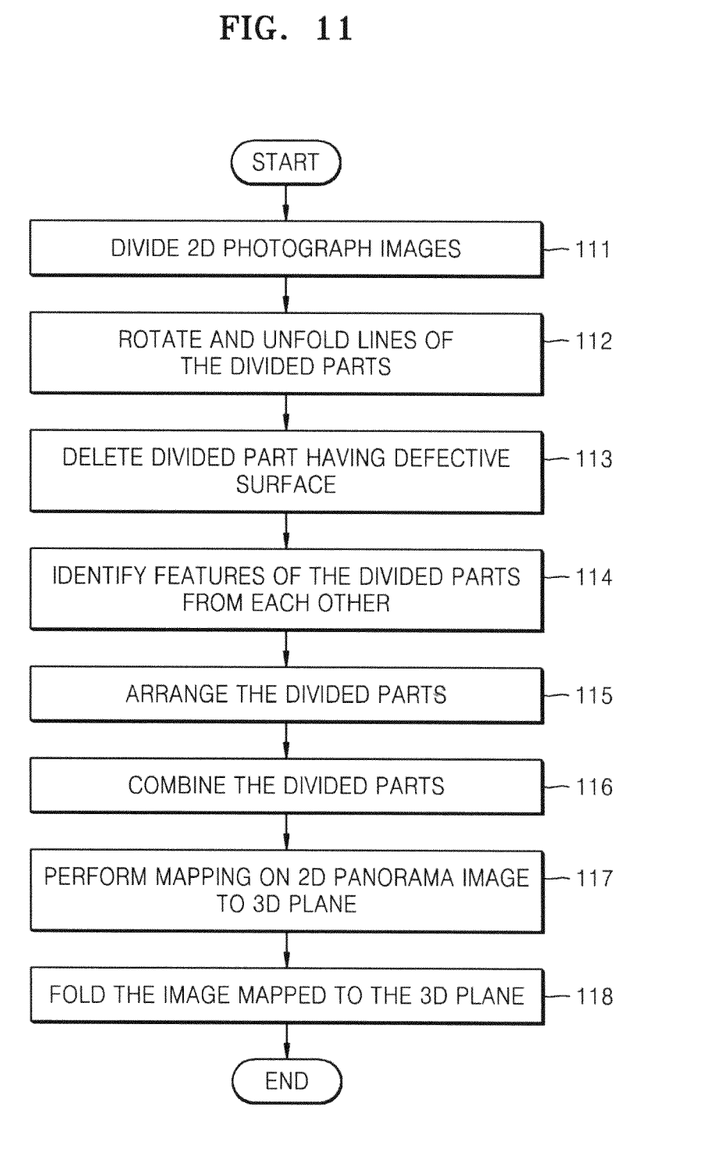
FIG. 11 is a flowchart of a method of generating a 3D image according to another embodiment of the present invention.

FIG. 11 is a flowchart of a method of generating a 3D image according to another embodiment of the present invention.

Referring to FIG. 11, the method of generating a 3D image according to the embodiment includes time-series operations performed by the apparatus for generating a 3D image illustrated in FIG. 1. Therefore, the aforementioned description associated with the apparatus for generating a 3D image illustrated in FIG. 1 is applied to the method of generating a 3D image according to the current embodiment.

In operation 111, the apparatus for generating a 3D image receives 2D photograph images and divides the 2D photograph images according to lines corresponding to vertical edges of each object in the 2D photograph images.

In operation 112, the apparatus for generating a 3D image rotates the lines of the parts of the 2D photograph images divided in operation 111 so as to be in parallel with each other in a vertical direction, and unfolds the divided parts including the rotated lines.

In operation 113, the apparatus for generating a 3D image deletes a divided part having one or more defective surfaces from the divided parts of the 2D photograph images rotated and unfolded in operation 112.

In operation 114, the apparatus for generating a 3D image identifies features of the divided parts of the 2D photograph images normalized in operations 111 to 113 from each other, and when a difference between features of two or more identified divided parts is less than a threshold range, determines that the two or more divided parts are the same. When a difference between features of divided parts exceeds the threshold range, the apparatus for generating a 3D image determines that the divided parts are different from each other.

In operation 115, the apparatus for generating a 3D image arranges the divided parts of the 2D photograph images so that the divided parts which are determined to be the same from among the divided parts of the 2D photograph images in operation 114 are positioned at the same position.

In operation 116, the apparatus for generating a 3D image combines the divided parts arranged in operation 115 so that the divided parts arranged at the same position in operation 115 are represented as a single divided part.

In operation 117, the apparatus for generating a 3D image performs mapping on a 2D panorama image generated in operations 114 to 116 to a 3D plane in which a coordinate value of each pixel is represented as a 3D coordinate (x, y, z).

In operation 118, the apparatus for generating a 3D image folds the image mapped to the 3D plane in operation 117 according to borders of the divided parts of the image mapped to the 3D plane in operation 117, that is, the lines corresponding to the vertical edges of each object.

Figure 12:
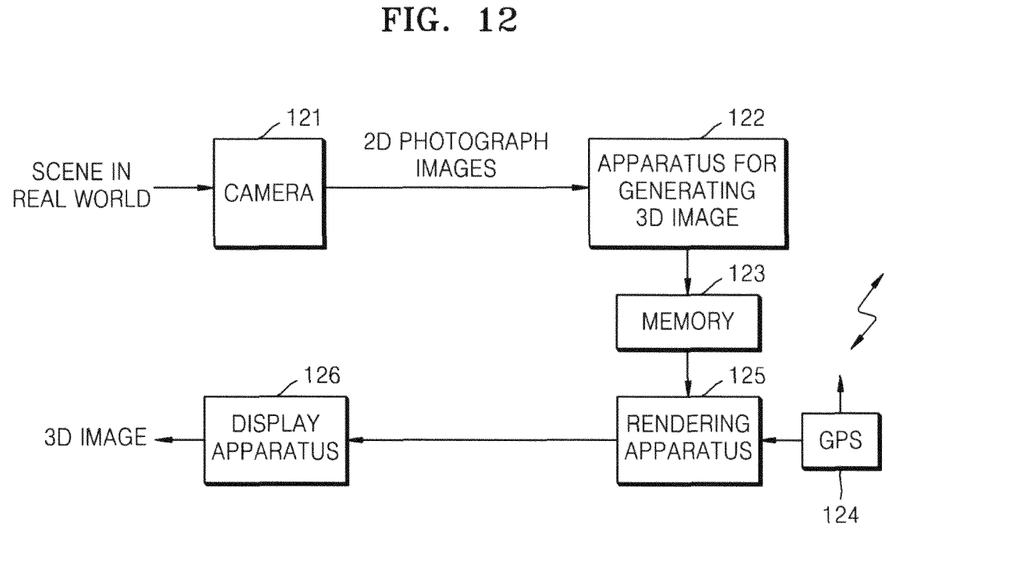
FIG. 12 is a structural view illustrating a navigation system using the apparatus for generating a 3D image illustrated in FIG. 1.

FIG. 12 is a block diagram illustrating a navigation system using the apparatus for generating a 3D image illustrated in FIG. 1.

Referring to FIG. 12, the navigation system using the apparatus for generating a 3D image illustrated in FIG. 1 includes a camera 121, an apparatus for generating a 3D image 122, a memory 123, a global positioning system (GPS) 124, a rendering apparatus 125, and a display apparatus 126. The apparatus for generating a 3D image 122 is the same as the apparatus for generating a 3D image illustrated in FIG. 1, so that a detailed description thereof is omitted.

The camera 121 generates 2D photograph images by shooting a scene in a real world. A moving object (for example, a car) may be provided with a plurality of cameras at various positions of a front part of the moving object so that a scene corresponding to a moving direction can be shot at various positions and elevations. Otherwise, a single camera provided to a position of the front part of the moving object may obtain 2D photograph images for a scene according to moving directions at various positions and elevations.

The apparatus for generating a 3D image 122 generates a 2D panorama image showing the whole scene by combining the 2D photograph images generated by the camera 121 and generates a 3D image by folding the 2D panorama image on the basis of image information on the 2D panorama image.

The memory 123 stores the 3D image generated by the apparatus for generating a 3D image 122. Therefore, the 3D image generated from the 2D photograph images taken by the camera 122 may be stored in the memory 123. However, according to the current embodiment, it will be understood by those skilled in the art that the navigation system may not include the camera 121 and the apparatus for generating a 3D image 122 but only include the memory 123 storing the 3D image generated by another apparatus in advance instead of the navigation system. In addition, since the apparatus for generating a 3D image 122 according to the current embodiment performs simple calculation to generate the 3D image, the moving object may not include a large capacity memory storing 3D images of all regions where the moving object moves to. Instead, the moving object directly generates a 3D image by using 2D photograph images of a scene where the moving object is currently positioned and deletes 3D images at a region far from the moving object from the 3D images stored in the memory 123, so that a small capacity memory can be applied.

The GPS 124 receives current position information on the navigation system provided to the moving object from one or more GPS satellites.

The rendering apparatus 125 extracts 3D images corresponding to the current position information on the navigation system received from the GPS 124 from the 3D images stored in the memory 123 and performs rendering on the extracted 3D images on a 2D plane corresponding to the moving direction of the moving object provided with the navigation system.

The display apparatus 125 displays a result of the rendering performed by the rendering apparatus 125.

Figure 13:
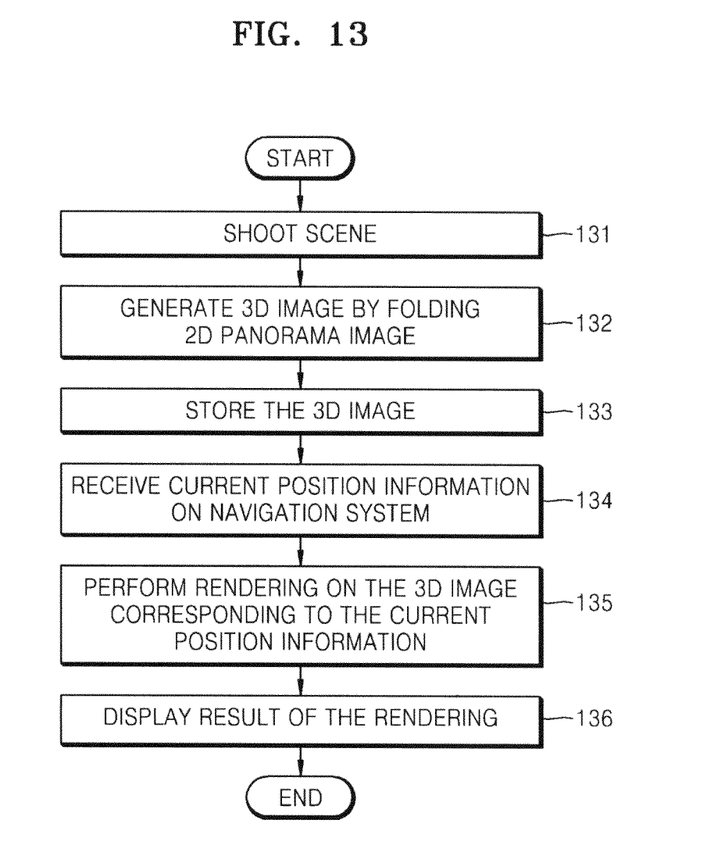
FIG. 13 is a flowchart of a navigation method according to another embodiment of the present invention.

FIG. 13 is a flowchart of a navigation method according to another embodiment of the present invention.

Referring to FIG. 13, the navigation method according to the current embodiment includes time-series operations performed by the navigation system illustrated in FIG. 12. Therefore, the aforementioned description associated with navigation system illustrated in FIG. 12 is applied to the navigation method according to the current embodiment.

In operation 131, the navigation system shoots a scene in a real world and generates 2D photograph images.

In operation 132, the navigation system generates a 2D panorama image showing the whole scene by combining the 2D photograph images generated in operation 131 and generates a 3D image by folding the 2D panorama image on the basis of image information on the 2D panorama image.

In operation 133, the navigation system stores the 3D image generated in operation 132.

In operation 134, the navigation system receives current position information on the navigation system provided to a moving object from one or more GPS satellites.

In operation 135, the navigation system extracts 3D images corresponding to the current position information on the navigation system received in operation 134 from the 3D images including the 3D images stored in operation 133, and performs rendering on the extracted 3D image on a 2D plane corresponding to a moving direction of the moving object provided with the navigation system.

In operation 136, the navigation system displays a result of the rendering performed in operation 135.

Accordingly, the 2D panorama image can be generated by using the 2D photograph images, and a 3D image can be generated by folding the 2D panorama image on the basis of the image information on the 2D panorama image. Therefore, the 3D image can be generated very simply without complex calculation for obtaining 3D geometric information.

The embodiments of the present invention can be written as computer programs and can be implemented in general-use digital computers that execute the programs using a computer readable recording medium. In addition, a structure of data used according to the embodiments of the present invention can be recorded in a computer readable recording medium through various means. Examples of the computer readable recording medium include magnetic storage media (e.g., ROM, floppy disks, hard disks, etc.) and optical recording media (e.g., CD-ROMs, or DVDs).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of generating a 3D image comprising:
    modifying image deterioration according to a perspective view by normalizing a plurality of 2D images each of which partially show a scene;
    generating a 2D panorama image showing the whole scene by combining the normalized plurality of 2D images; and
    generating a 3D image by folding the 2D panorama image on the basis of image information on the 2D panorama image using a computer,
    wherein, the normalizing the plurality of 2D images is performed automatically and comprises:
        detecting edges of the plurality of 2D images to divide the plurality of 2D images according to lines corresponding to the detected edges;
        rotating lines of the parts of the plurality of 2D images divided b the divider to be in parallel with each other in a vertical direction; and
    unfolding the divided parts including the rotated lines such that side surfaces of an object in the scene face forward.

2. The method of claim 1, wherein in generating the 3D image, the 2D panorama image is folded according to lines corresponding to vertical edges of each object in the 2D panorama image.

3. The method of claim 1, wherein in generating the 3D image, the 2D panorama image is folded by increasing depth values of pixels of lines corresponding to side surfaces of each object in proportion to distances between lines corresponding to vertical edges of each object in the 2D panorama image and lines corresponding to side surfaces of each object.

4. The method of claim 1,
    wherein generating the 2D panorama image comprises:
        arranging divided parts of the 2D images so as to allow divided parts that are determined to be the same from among the divided parts of the 2D images to be positioned at the same position; and combining the arranged divided parts so as to allow the divided parts arranged at the same position to be represented as a single divided part.

5. The method of claim 4, wherein in combining the 2D images, the arranged divided parts are combined by selecting a divided part having image information with larger data from the divided parts arranged at the same position.

6. A non-transitory computer-readable medium having embodied thereon a computer program for executing the method of claim 1.

7. The method of claim 1, wherein the method is performed in a navigation system, and the method further comprises extracting a 3D image corresponding to current position information on the navigation system from 3D images including the generated 3D image and performing rendering on the extracted 3D image on a 2D plane corresponding to a moving direction of a moving object provided with the navigation system.

8. An apparatus for generating a 3D image comprising:
a normalization unit to modify image deterioration according to a perspective view by normalizing a plurality of 2D images each of which partially show a scene;
a 2D panorama image generator to generate a 2D panorama image showing the whole scene by combining the normalized plurality of 2D images; and
a 3D image generator to generate a 3D image by folding the 2D panorama image on the basis of image information on the 2D panorama image,
wherein, the normalizing the plurality of 2D images is performed automatically and further comprises the normalization unit to:
detect edges of the plurality of 2D images to divide the plurality of 2D images according to lines corresponding to the detected edges;
rotate lines of the parts of the plurality of 2D images divided by the divider to be in parallel with each other in a vertical direction; and
unfold the divided parts including the rotated lines such that side surfaces of an object in the scene face forward.

9. The apparatus of claim 8, wherein the 3D image generator folds the 2D panorama image according to lines corresponding to vertical edges of each object in the 2D panorama image.

10. The apparatus of claim 8, wherein the 3D image generator folds the 2D panorama image by increasing depth values of pixels of lines corresponding to side surfaces of each object in proportion to distances between lines corresponding to vertical edges of each object in the 2D panorama image and lines corresponding to side surfaces of each object.

11. The apparatus of claim 8, wherein the 2D panorama image generator comprises:
an arrangement unit to arrange divided parts of the 2D images so as to allow divided parts that are determined to be the same from among the divided parts of the 2D images to be positioned at the same position; and
a combination unit to combine the arranged divided parts so as to allow the divided parts arranged at the same position to be represented as a single divided part.

12. The apparatus of claim 11, wherein the combination unit combines the arranged divided parts by selecting a divided part having image information with larger data from the divided parts arranged at the same position.

13. A navigation system comprising:
an apparatus to generate a 3D image, wherein the apparatus comprises:
a normalization unit to modify image deterioration according to a perspective view by normalizing a plurality of 2D images each of which partially show a scene;
a 2D panorama image generator to generate a 2D panorama image showing the whole scene by combining the normalized plurality of 2D images; and
a 3D image generator to generate the 3D image by folding the 2D panorama image on the basis of image information on the 2D panorama image;
a memory to store the generated 3D image; and
a rendering apparatus to extract a 3D image corresponding to current position information on the navigation system from 3D images stored in the memory, including the generated 3D image, and to perform rendering on the extracted 3D image on a 2D plane corresponding to a moving direction of a moving object provided with the navigation system,
wherein, the normalizing the plurality of 2D images is performed automatically and further comprises the normalization unit to:
detect edges of the plurality of 2D images to divide the plurality of 2D images according to lines corresponding to the detected edges;
rotate lines of the parts of the plurality of 2D images divided by the divider to be in parallel with each other in a vertical direction; and
unfold the divided parts including the rotated lines such that side surfaces of an object in the scene face forward.

14. A method of generating a 3D image comprising:
normalizing a plurality of 2D images each of which partially show a scene, wherein normalizing the plurality of 2D images is performed automatically and further comprises:
detecting edges of the plurality of 2D images to divide the plurality of 2D images according to lines corresponding to the detected edges;
rotating lines of the parts of the plurality of 2D images divided by the divider to be in parallel with each other in a vertical direction; and
unfolding the divided parts including the rotated lines such that side surfaces of an object in the scene face forward;
generating a 2D panorama image showing the whole scene by combining the normalized plurality of 2D images; and
generating a 3D image by folding the 2D panorama image on the basis of image information on the 2D panorama image using a computer.

* * * * *

UNITED STATES PATENT AND TRADEMARK OFFICE
CERTIFICATE OF CORRECTION

| | | |
|---|---|---|
| PATENT NO. | : 8,487,926 B2 | Page 1 of 1 |
| APPLICATION NO. | : 12/078181 | |
| DATED | : July 16, 2013 | |
| INVENTOR(S) | : Hee-sae Lee et al. | |

It is certified that error appears in the above-identified patent and that said Letters Patent is hereby corrected as shown below:

In the Claims

In Column 10, Line 48, In Claim 1, delete "b" and insert -- by --, therefor.

Signed and Sealed this
Eighteenth Day of February, 2014

Michelle K. Lee
*Deputy Director of the United States Patent and Trademark Office*